(12) United States Patent
Gustafsson et al.

(10) Patent No.: US 7,436,843 B2
(45) Date of Patent: Oct. 14, 2008

(54) METHOD FOR ACCESS SELECTION

(75) Inventors: Eva Gustafsson, Stockholm (SE);
Jürgen Sauermann, Aachen (DE);
Ryoji Kato, Yokusuka Kanagawa (JP);
Johnson Oyama, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 900 days.

(21) Appl. No.: 10/724,391

(22) Filed: Dec. 1, 2003

(65) Prior Publication Data
US 2004/0218605 A1 Nov. 4, 2004

Related U.S. Application Data

(60) Provisional application No. 60/466,422, filed on Apr. 30, 2003.

(51) Int. Cl.
*H04L 12/28* (2006.01)
*H04Q 7/00* (2006.01)
*H04Q 7/20* (2006.01)
*H04J 3/16* (2006.01)
*H04M 1/00* (2006.01)

(52) U.S. Cl. .................. 370/401; 370/328; 370/331; 370/332; 370/465; 455/432.1; 455/550.1

(58) Field of Classification Search .......... 370/395.2, 370/338, 329, 331–333, 401, 328, 426; 455/432.1, 455/550.1
See application file for complete search history.

(56) References Cited

U.S. PATENT DOCUMENTS 6,813,507 B1 * 11/2004 Gress et al. ............ 455/466
6,898,432 B1 * 5/2005 Jiang ..................... 455/456.1

7,230,951 B2 * 6/2007 Mizell et al. ............ 370/401

(Continued)

FOREIGN PATENT DOCUMENTS

WO 01/35585 A1 5/2001

(Continued)

OTHER PUBLICATIONS

Jonsson et al, "Access Selection in an Always Best Connected Environment", Wireless World Research Forum, Contribution to the 5th WWRF Metting in Temple, Mar. 7-8, 2002.

(Continued)

*Primary Examiner*—Kevin C. Harper
*Assistant Examiner*—Xavier Wong
(74) *Attorney, Agent, or Firm*—Nixon & Vanderhye P.C.

(57) ABSTRACT

A method for selecting the best access for terminals (210) in IP-based multi-access communication systems (200) is provided. The access selection is performed on the network side by an access wizard (261) that communicates with a profile server (262) associated with a number of databases (263). Via the profile server, the access wizard collects database information related to user, terminal, access networks and/or operator. It determines a "best" access network based on this information and preferably also on terminal specific information, e.g. terminal location and available access networks, from an access wizard agent (213) in the terminal. The best access is signaled from the access wizard, via the access wizard agent, and to an access manager (214) in the terminal, which has means for executing the actions necessary to use the best access.

27 Claims, 7 Drawing Sheets

U.S. PATENT DOCUMENTS

2002/0039892 A1* 4/2002 Lindell .................... 455/151.1
2004/0098669 A1* 5/2004 Sauvage et al. ............. 715/513
2004/0203914 A1* 10/2004 Kall et al. ................ 455/456.1

FOREIGN PATENT DOCUMENTS

WO    WO 02/098057 A2 * 12/2002

OTHER PUBLICATIONS

Gustafsson et al, "Always Best Connected", IEEE Wireless Communications, vol. 10, Issue 1, Feb. 2003, pp. 49-53.
Johnson et al, "Mobility Support in IPv6" Draft-ietf-mobileip-ipv6-24.txt, IETF Mobile IP Working Group draft, Jun. 30, 2003.
Calhoun et al, "Diameter Mobile IP Application", AAA Working Group Internet Draft, draft-ietf-aaa-diameter-mobileip-15.txt, Nov. 2003.

* cited by examiner

METHOD FOR ACCESS SELECTION

This application claims the benefit of Provisional Application No. 60/466,422, filed 30 Apr. 2003. The entire contents of these applications are incorporated herein by reference.

TECHNICAL FIELD

The present disclosure generally relates to multi-access communication systems based on the Internet Protocol (IP) and in particular to methods and a apparatuses for access selection in such systems.

BACKGROUND

Today, IP-based network services are often offered over several types of network technologies, such as General Packet Radio Service (GPRS), Wireless Local Area Network (WLAN), Wideband Code Division Multiple Access (WCDMA), xDSL, cable modem, and Ethernet. Many mobile user devices are provided with multiple access interfaces to be able to make the most of this situation. Multi-access communication systems are generally more flexible than single-access networks but they also introduces an additional degree of complexity and involves a number of new requirements, choices and considerations.

General aspects of multi-access networks are addressed by the Always Best Connected (ABC) concept [1], [2], which envisions a communication environment where the user is always connected over the best available access network and device. The overall ABC concept can be seen as a framework of requirements:

Always—at any point in time, the user shall obtain the best communication experience.

Best—refers to the user experience. The best experience might, for instance, refer to the cheapest access network, the best application performance, the highest bandwidth, or the best device in combination with access and applications. What is best thus depends on user perception and in technical terms also on a combination of network characteristics, cost, device capabilities, application requirements, operator policies etc.

Connected—it is important to consider both what/whom the user is connected to, for example an application server, a corporate network, the Internet, another person, or another machine, and what/whom the user connected through, such as devices, a personal area network (PAN), access networks, backbones, the Internet etc. All of these entities and networks may affect the user experience.

Designing solutions for scenarios like ABC includes consideration of different business scenarios, different architecture options, and different technical solutions. Hereby, important areas are: (i) subscription handling and infrastructures for authentication/authorization; (ii) service availability; (iii) service adaptation across multiple different accesses and different devices; (iv) mobility management; (v) distributed terminals/devices—PANs; (vi) access availability; and (vii) how to choose access, including how to define "best" [1]. This document primarily addresses aspects of the last area (vii) of access choice/selection.

Solutions for access selection in IP-based multi-access communication systems in the prior art often involve an active decision as for which access network to use by the end user effected through the graphical user interface (GUI) of his/her device. Alternatively, or in addition thereto, the multi-access terminal comprises a default priority list that is compared with currently available accesses The International Patent Application WO 01/35585 A1 [3] proposes a mechanism for access-selection based on individual user preferences. The end device identifies available access networks and uses an indirect interface, such as a Bluetooth radio interface, to determine their respective access capability (cost of access, available bandwidth, etc.). The determined access capability is compared to a preferred access capability of the end device/user, which is stored at the end device and can be updated by the user. After all available access networks have been checked a best access is selected. The end device may continue to look for new available access networks and reconsider its access decision during a connection.

The conventional access selection methods are typically associated with rather heavy demands on both the end user and on his/her user equipment. Moreover, for a proper access selection many factors have to be considered and it can often be difficult for the user/terminal to obtain all information needed as well as to analyze complex access situations.

Particularly demanding arc cases where the mobile multi-access terminal resides in a car or another vehicle. Such vehicle scenarios typically require fast access selections and handoffs in order to maintain optimal access and avoid lost calls/sessions due to changed access situations. An access selection mechanism capable of handling vehicle scenarios satisfactory would thus be very desirable.

Accordingly, there is a considerable need for an improved method for access selection in multi-access networks.

SUMMARY

In an aspect of the disclosure, an improved method for access selection in IP-based multi-access networks. A specific object is to enable optimized access selection for end users in multi-access networks. Another object is to provide an access selection mechanism suitable for overall multi-access solutions like ABC mechanisms. Still another object is to provide an access selection mechanism suitable for vehicular scenarios.

Briefly, is proposed that the access selection be performed at the network side in order to connect a mobile terminal with multiple access possibilities to the best IP access network. The access network concept can in this context e.g. be based on technology, owner/operator or geography. The network-based access selection is achieved by an access wizard unit, communicating with a profile server, which provides a unified interface to a number of databases in the network. Via the profile server, the access wizard unit collects database information, such as access network properties, operator policies, operator/user prioritization criteria and allowed user subscription profiles based on which it determines a "best" access network. Preferably, the access selection at the access wizard unit is also based on terminal specific information, such as current terminal location and available access networks, received from an access wizard agent in the mobile terminal. A recommendation/indication of the best access is signaled from the access wizard unit to the access wizard agent, and then to an access manager in the terminal associated with means for connecting the best access network.

An example access selection method contributes to make it possible for users to always be connected to the best access network. The proposed solution enables well-founded access decisions, since many factors related to the user and terminal as well as to the access networks and operators can be considered. The network-based access selection also offers an overall perspective, through which network resources can be better used. Another advantage of the access selection of the invention is that it is capable of handling large data quantities and heavy computations.

In an embodiment, it is the access manager that performs the final decision as for which access network to use based on the recommendation from the access wizard unit, possibly together with user input and/or a priority list in the terminal. This can be useful e.g. in case the access network selected by the access wizard unit has changed or is down.

Besides the proposed mechanism for selecting the currently best access network for the terminal, mechanisms for predicting which access network will be best after a predetermined period of time as well as for suggesting an alternative route in case there are no appropriate access networks in the intended route are provided. These solutions are especially advantageous for multi-access terminals in vehicles.

In accordance with other advantageous embodiments, the access wizard unit assists the security infrastructure for achieving seamless mobility and that applications are adapted at network level (on the network side) through support from the profile server.

According to other aspects, a server device, a communication system and a mobile terminal with means for access selection are provided.

BRIEF DESCRIPTION OF THE DRAWINGS

The present invention, together with further objects and advantages thereof, is best understood by reference to the following description and the accompanying drawings, in which.

DETAILED DESCRIPTION

Figure 1:
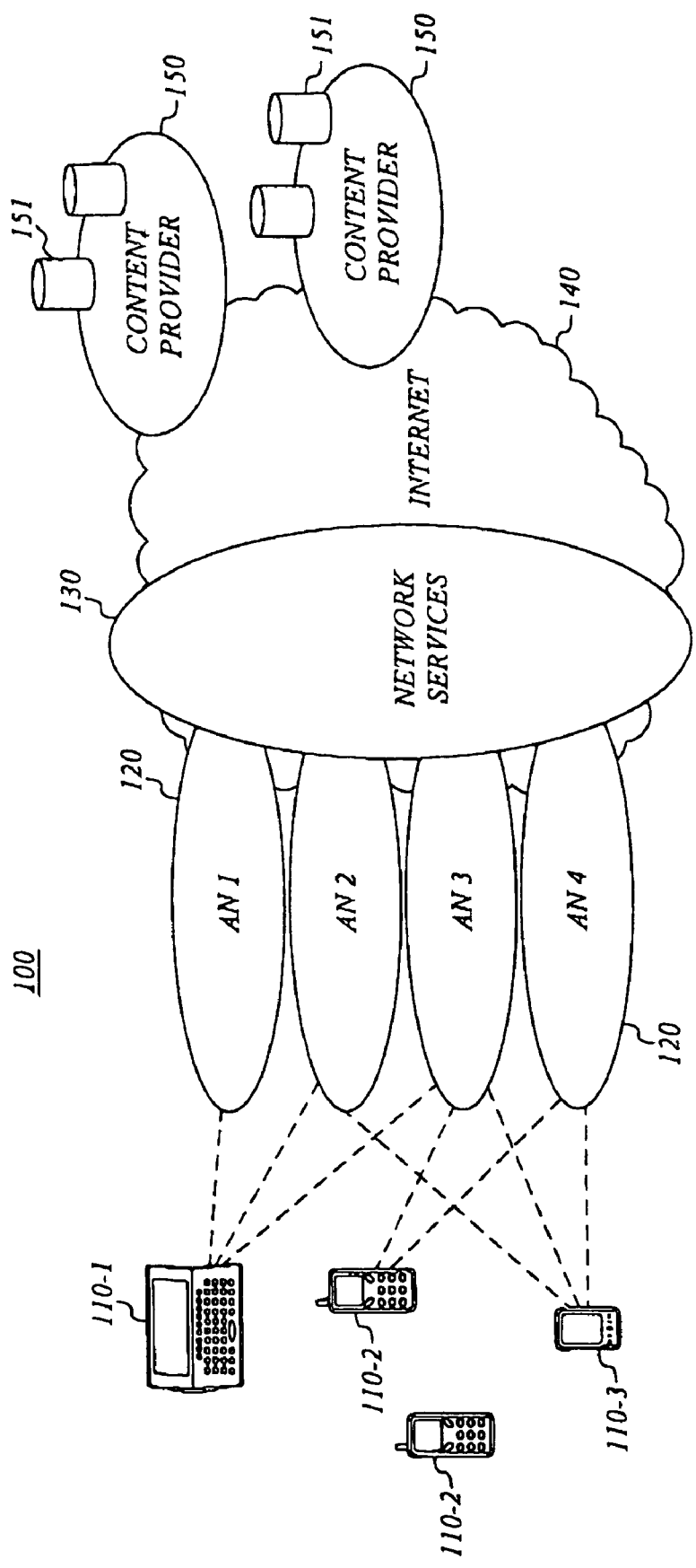
FIG. 1 is a schematic view of an example multi-access communication system.

As mentioned in the background section, many communication systems of today comprise a plurality of access networks offering alternative access options for mobile terminals with the right capabilities. Such a multi-access communication system is schematically illustrated in FIG. 1. The illustrated communication system 100 comprises mobile terminals 110 with several access alternatives. The terminals 110 can use any of the multiple access networks (ANs) 120 to reach IP-based network services 130, which are offered by content providers 150 (with associated data sources 151) over the Internet 140 or another packet based network. Examples of network services include content distribution network services with content caching, multimedia messaging services (MMS), voice over IP services, etc.

The disclosed embodiments can be applied in connection with any mobile node/terminal 110 that has at least two access possibilities (also referred to as a multi-access terminal), such as two separate physical access network connections or one connection through which either of two separate access networks can be reached. The access network interfaces of the multi-access terminal can either provide direct external network access to the respective access network or network access via another device that belongs to the same PAN as the multi-access terminal. In the illustrated system 100, the multi-access terminals are represented by a laptop computer 110-1, cellular phones 110-2 and a personal digital assistant (PDA) 110-3.

The access networks 120 can be wireline or wireless and may for instance use a technology selected from the group of GPRS, WLAN, Ethernet, Bluetooth, Wireless Fidelity (WiFi), xDSL, CDMA, WCDMA, broadcasting, Digital Video Broadcasting (DVB) and cable modem. For the purpose of this document, two networks can e.g. be considered as separate access networks if they use separate access network technologies, such as a GPRS and a WLAN system and/or have different owners. The access network definitions can also be based on geography and/or IP address networks. The properties and characteristics of the access networks 120 may differ a lot in terms of features like capacity dynamics, cost and acceptable load levels.

An aspect of the disclosure focuses on how to select the best access network. Which access network that is best for the user in a particular situation depends on a number of factors, including:

available access networks and their capabilities (bandwidth, cost, QoS, operator, technology, current load, etc.)
requirements from applications
device capabilities
user preferences and/or subscription
network operator preferences As described in the background section, access selection in IP networks according to the prior art is generally user-based, i.e. the user decides what access network to use e.g. through a GUI, and/or terminal-based, i.e. the terminal selects an access network e.g. based on a default priority list, which is checked against currently available accesses. Instead, a method and architecture for network-based access selection in IP-based multi-access communication systems is proposed. Network-based access selection indicates that an entity in the network collects information and suggests the terminal in which access is the best.

The network-based access selection offers mechanisms by means of which the above-mentioned and other factors can be weighed together into an appropriate access network decision. As will be evident from the following description, even very complex access situations can be handled and the network-based access selection can be combined with terminal/user-based access selection to achieve a very robust system.

Figure 2:
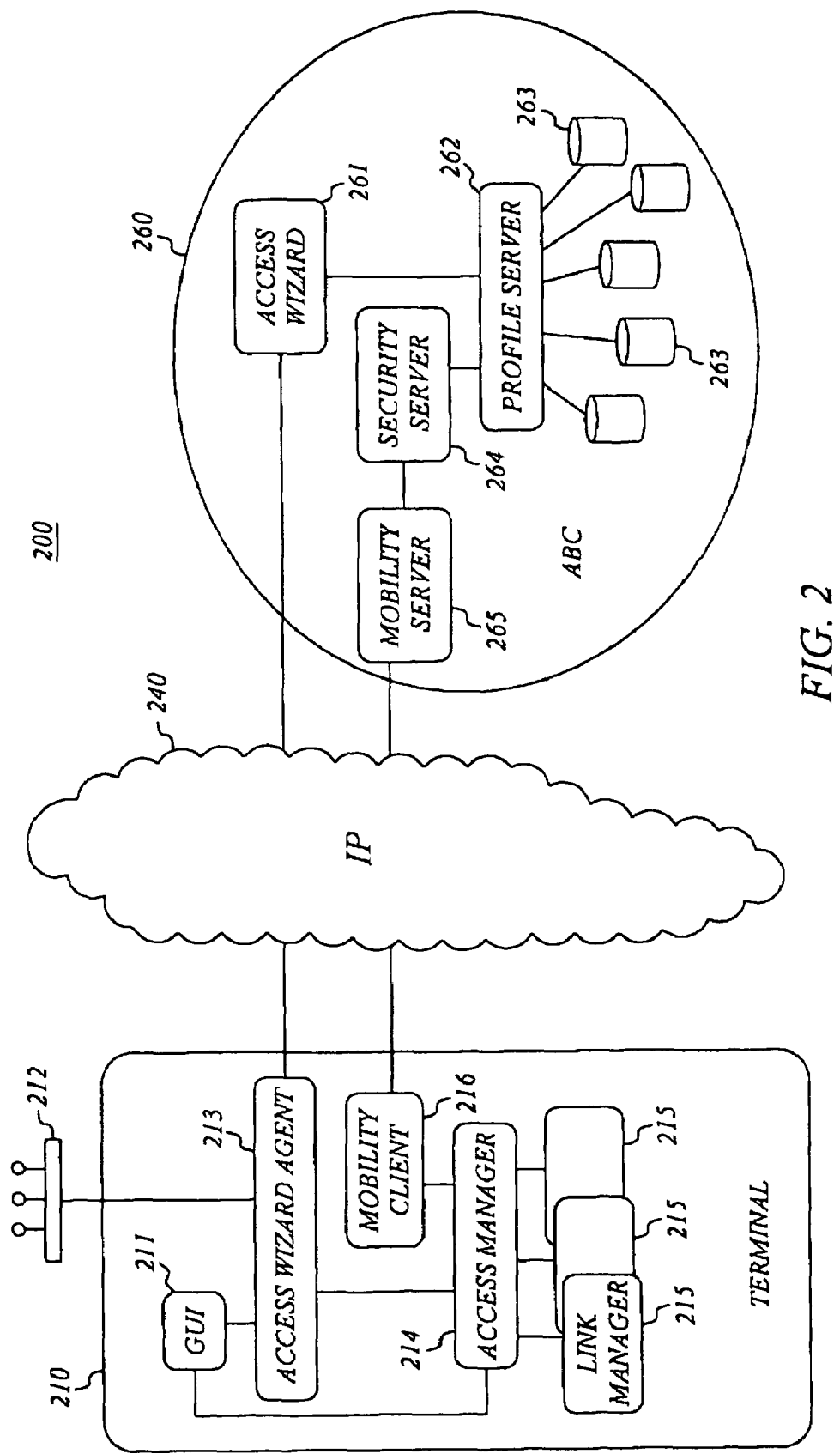
FIG. 2 is a schematic block diagram of a multi-access communication system for access selection according to a first embodiment.

The functional architecture of the proposed new mechanism for access selection in multi-access IP networks is illustrated in FIG. 2. The illustrated system 200 includes a mobile multi-access terminal /node 210 communicating with an Always Best Connected (ABC) service network 260 over an IP-based network 240, such as the Internet. The terminal 210 is equipped with a GUI 211 and associated with sensors 212 to provide terminal-specific information related to for example position and velocity. The main access selection functions are performed by an access selection unit (also referred to as access wizard unit)261 and a profile server 262 at the network side as well as an access agent (also referred to as access wizard agent) 213, an access manager 214 and link managers 215 at the terminal side.

The access wizard unit 261 is a server unit/function arranged at the network side and plays a key role in the network-based access selection. The access wizard agent 213 of the terminal 210 preferably signals information to the access wizard 261 about currently available access networks as well as current location, route and/or velocity of the terminal. The access wizard unit 261 then collects database information through the profile server 262, which provides a unified interface towards a number of databases 263. Based on the information from the profile server 262 and the access wizard agent 213, the access wizard unit 261 selects an access network (120 in FIG. 1) that is considered to be best for and thus is preferred to be used by the terminal 210. This information is signaled from the access wizard unit 261 to the access wizard agent 213. From there it is forwarded to the access manager 214, which executes the actions necessary in order to use the best access.

An advantage of the for network-based access selection is that the major data transfer occurs on the network side (between the access wizard unit and the profile server) and normally does not have to rely on narrowband wireless links. Thereby, large quantities of database information can be handled. The data/information provided to the access wizard unit via the profile server can for instance refer to specific access networks, user devices, end users and/or operators. It typically includes information about access network availability, operator policies, operator/user prioritization criteria, as well as allowed user subscription profiles.

Through the profile server 262, the network access selection offers a most efficient solution for handling database information. For an appropriate access selection, the access wizard unit generally needs various types of information that is typically provided in many different formats and languages. Such database information/profiles can be held in many different databases stored at different locations in the network. Before transmitting the respective pieces of database information to the access wizard unit, the profile server checks if they need to be adapted. If so, the profile server adjusts and/or converts the data such that it can be read by the access wizard unit.

The network-based access selection accomplished by the access wizard unit and the profile server is thus very advantageous. It provides for well-founded access decisions based on various factors related to e.g. the user, terminal, the access networks and operators, and is capable of handling large data quantities and heavy computations. Furthermore, the network-based access selection offers an overall perspective, by means of which network resources can be better utilized. It can for example be used by operators or Internet service providers (ISPs) to control and distribute user traffic in an appropriate manner.

In an embodiment, the final decision as for which access network that is currently the best lies with the access manager 214. The access manager makes this decision based on information from the access wizard unit, preferably together with information input from the GUI (user intervention) and/or from a profile or priority list stored locally at the terminal. After determining which network is currently the best, the access manager provides corresponding instructions to the link manager(s). There are generally one link manager 215 for each access network interface of the terminal 210 through which the terminal can be connected/disconnected to the respective access network. Another typical function of the link managers 215 is to detect available/current access networks and report this information to the access manager 214, from where it can be passed on to the access wizard unit 261 via the access wizard agent 213.

An advantage of solutions where the final access selection/ determining is performed by the access manager is that the access manager can be used as a fallback mechanism through which access selection can be performed even if some functions for network-based access selection should be down. Moreover, implementations where the access manager normally follows the access recommendation from the access wizard unit but is allowed too choose another access are very useful in situations where the recommended access network has changed or is down. For example, there may be embodiments where a possible active choice by the user through the GUI take precedence, followed by the access recommendation from access wizard unit, and finally a priority-list in the terminal can be used if the access recommendation is absent or not valid.

Although the access wizard unit preferably receives terminal-specific information, such as information about available access networks and current terminal location, from the access wizard agent, there may be cases where no such information transfer occurs Without knowing which access networks are actually available, the access wizard can still perform the network-based access selection, and send an access recommendation involving one (or a list of several) best access network(s) which has to be checked against available access networks in the terminal.

The access wizard agent is thus the functionality of the terminal that communicates with the access wizard unit. It also communicates with other units/functions within terminal for transfer of information between the terminal and the access wizard unit. The access wizard agent can with advantage be implemented through comparatively simple units/ functions, the main purpose of which is to forward information to/from the access wizard unit. However, there may be embodiments with more complex access wizard agents as well.

The signaling between the access wizard unit and access wizard agent is performed over secure links, on application level, e.g. by means of the Hypertext Transfer Protocol (HTTP), or on lower layers.

The network-based units for access selection can with advantage be parts of an overall multi-access mechanism, such as an ABC service network that provides services related to mobility, security and access handling. The ABC service network is typically managed by a network operator, a mobile virtual network operator (MVNO) or a service/application provider, or provided in a corporate network. Other arrangements are possible, provided that the access wizard unit(s) and the profile server(s) are still network-based (arranged at the network side).

Still referring to FIG. 2, the illustrated ABC service network 260 further comprises a security server 264 and a mobility server 265. The security server 264 handles security-related matters like authentication and authorization, and can with advantage be implemented as an AAA (authentication, authorization, accounting) server. The databases 263 and profile server 262 are preferably secured through the security server 264. The mobility server 265 performs various mobility-related functions and can for example be based on solutions for Mobile IPv4, Mobile IPv6, SLM (session layer mobility) and/or SIP (session initiated protocol) mobility. Thus, as a terminal changes access network the user/terminal can be authenticated and authorized through the security server 264 and application sessions are maintained during the handoff by means of the mobility server 265 which communicates with mobility clients 216 in the respective multi-access terminals 210.

The access wizard, profile server, security server and mobility server units/functions preferably belong to the same operator network. Solutions where the profile server is colocated with the security server are particularly advantageous since they facilitate the secure handling of the database information. Furthermore, according to a preferred embodiment of the invention it is proposed that the access wizard unit assists the security infrastructure for achieving seamless mobility. This will be further described below.

Figure 3:
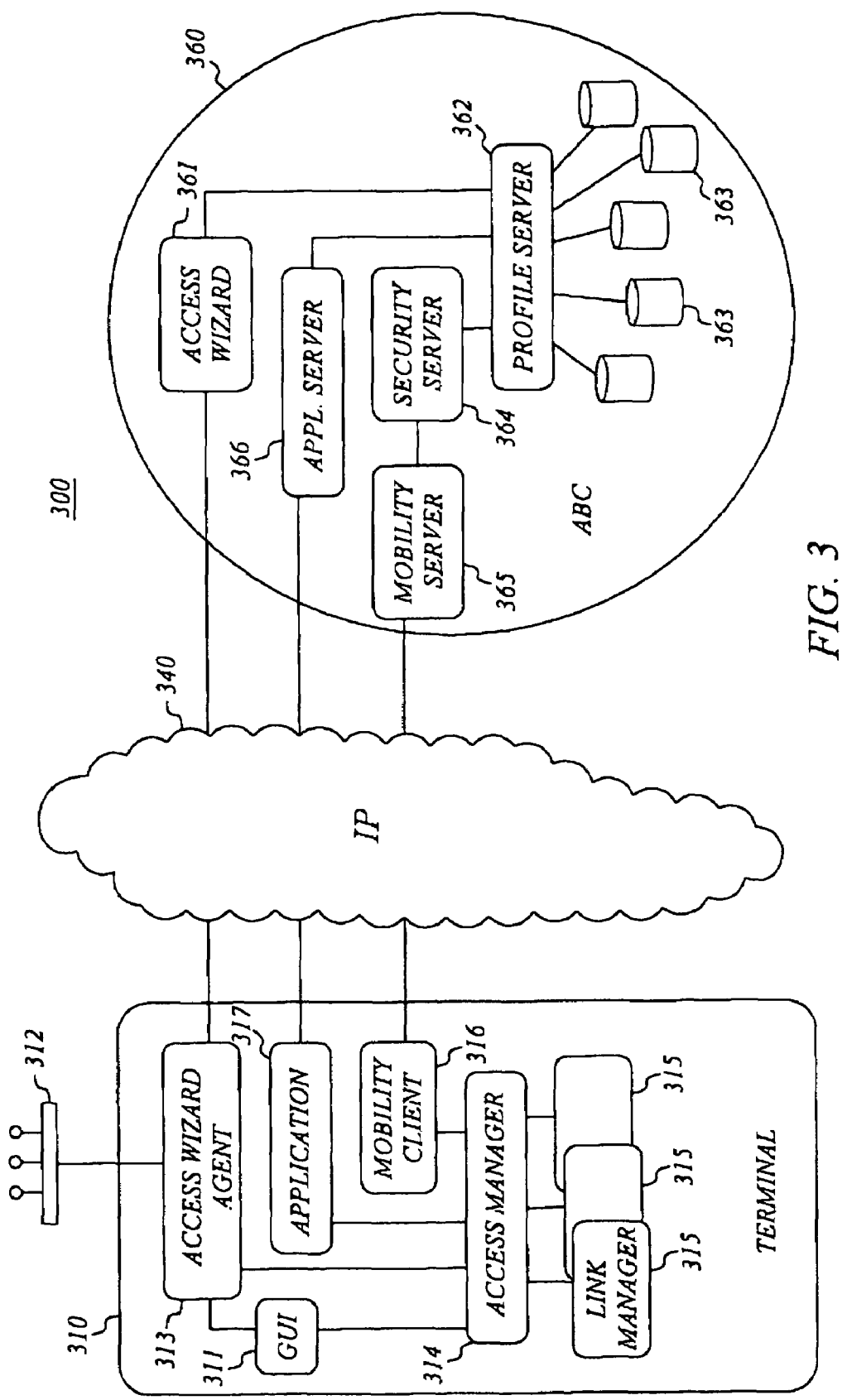
FIG. 3 is a schematic block diagram of a multi-access communication system for access selection according to a second embodiment.

FIG. 3 is a schematic block diagram of a multi-access communication system with access selection according to another example embodiment. FIG. 3 directly corresponds to FIG. 2, except that an application 317 on the terminal side and an application server unit/function 366 on the network side are shown. In accordance with this embodiment, the application server 366, which preferably is arranged in an ABC service network 360, collects/receives database information from the profile 362. The information is used to adapt the application 317 to suit the particular terminal/user. The application may for example be altered in response to the screen size of different user devices 310.

By adapting applications from the network side, many factors can be allowed to affect how the application is presented to the user. Another advantage is that transfer of unnecessary application information, i.e. information that the terminal cannot use, can be avoided.

Figure 4:
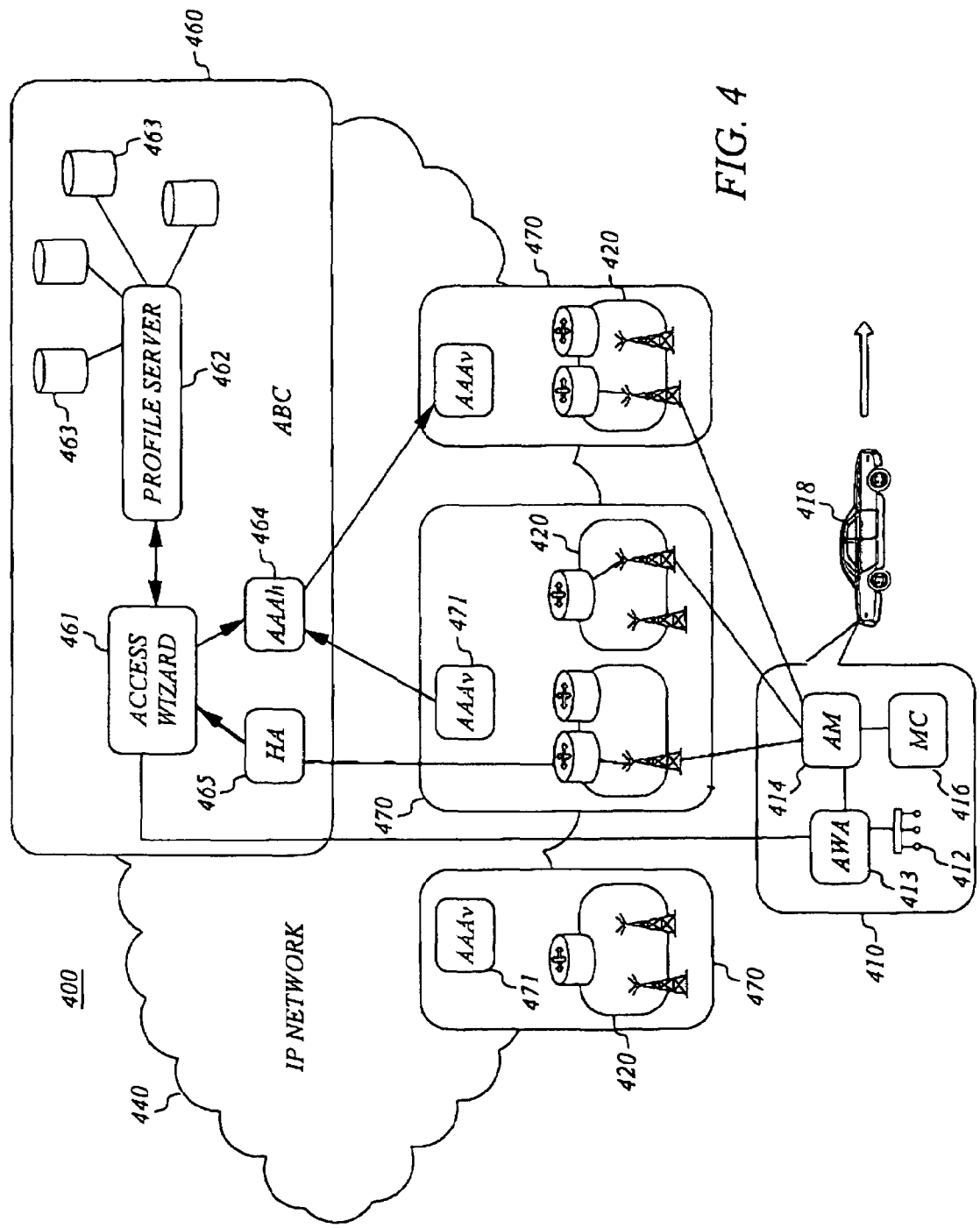
FIG. 4 is a schematic block diagram of a multi-access communication system for access selection according to a third embodiment suitable for vehicle scenarios.

FIG. 4 is a schematic block diagram illustrating access selection according to an example embodiment suitable for vehicle scenarios. In this example system 400, Mobile IPv6 is used for mobility management between a vehicle terminal 410 and an HA 465 located at an MVNO ABC network 460. The security function of the ABC service network 460 comprises an AAAh server 464. The AAA infrastructure for seamless mobility and the mobility client of FIG. 4 can for example correspond to the collection of AAAv and AAAh as described in Diameter MIPv4 application.

It is assumed that at any point in time at most one access network 420 is used as main access over which the Mobile IPv6 tunnel and signaling/communication between the terminal 410 in the vehicle 418 and the MVNO operator network 460 pass. The choice of access is accomplished through the network-based procedure of the invention, possibly in combination with user/terminal-based access selection. The access wizard unit 461 located at the MVNO operator network 460 is responsible for the network-based access selection, which will now be described more in detail by way of example.

In the terminal 410, an access wizard agent 413 preferably obtains information from the GPS, route, velocity sensors 412, finds out which application is currently used (e.g. via packet sniffing or from prior explicit signaling), and obtains information about currently available access networks (e.g. through active probes) via an access manager/link manager 414.

The access wizard agent 413 preferably forwards at least some of this information to the access wizard unit 461 in the ABC network 460, e.g. via a mobility tunnel. The terminal-specific information transmitted from the access wizard agent 413 to the access wizard unit 461 may for instance comprise currently used applications (port numbers/IP addresses), currently available (or visible) access networks 420 to the terminal 410, needed quality of service (QoS), as well as current location (from GPS), velocity, direction and route of the terminal 410.

The access wizard 461 in turn collects database information through the profile server 462 and its associated databases 463. The database information typically includes availability/properties of each access network, operator policies, operator/user prioritization criteria, as well as allowed user subscription profiles. The access network specific information transmitted from the profile server to the access wizard may for example include an access identifier, span (x, y), assigned AAAv, allowed port numbers/IP addresses/applications, allowed subscription level, estimated time remaining in access network for handoff to be allowed, allowed QoS, current level of congestion (can be provided to the access wizard from elsewhere), list of access networks, priority rules regarding operator selection criteria versus subscriber selection criteria, and/or operator prioritization of selection criteria. The user subscription profile may for example contain NAI (network access identifier), subscription level, allowed port numbers/IP addresses/applications, allowed QoS and/or subscriber prioritization of selection criteria.

Based on the collected information the access wizard unit 461 decides which access network 420 is currently best for the user/terminal 410 and signals this back to the access wizard agent 413. Within the terminal 410, the access wizard agent 413 forwards this information to the access manager 414, which executes the actions necessary to use the best access. The described mechanism for determining the currently best access is referred to as current access selection.

For current access selection, the logic taken within the access wizard unit 461 preferably takes into account both information from the access wizard agent 413 and information from the profile server 462/databases 463 A list of current candidate access networks can e.g. be produced by using the current location (x, y), velocity, direction, route (y=f(x)), and a list of detected available access networks. Thereafter, a prioritization program is run among these candidate accesses, taking into account prioritization regarding operator selection criteria vs. subscriber selection criteria, operator prioritization of selection criteria, and subscriber prioritization of selection criteria. The prioritization procedure results in one suggested current best access. The current best access selected at the ABC service network 460 is communicated (e.g. as an identification number) from the access wizard unit 461 back to the access wizard agent 413 in the terminal 410.

The network-based access selection procedure of the access wizard unit 461 can either be initiated through a request from the access wizard agent 413 in the terminal 410 or be initiated by the access wizard unit itself. In an embodiment, the access selection algorithm is executed every time the environment changes, such as when another access network becomes available/unavailable, or applications start/stop. Thereby, the best access network is updated to suit the new situation.

From the current location, route, and velocity information, the access wizard unit 461 can also predict which access network is going to be best for the terminal/user after a predetermined period of time. This is referred to as predictive access selection. The access wizard unit 461 signals the future best access to the access wizard agent 413, whereafter the access manager 414 can execute the actions necessary to use the future best access.

Also in this case, the logic taken within access wizard unit 461 should preferably take into account both information from the access wizard agent 413 and information from the profile server 462/databases 463. A list of future candidate access networks can e.g. be produced by using the current location (x, y), velocity, direction and route (y=f(x)) and assuming a certain future time. Thereafter, a prioritization program is run among these candidate accesses, taking into account prioritization regarding operator selection criteria vs. subscriber selection criteria, operator prioritization of selection criteria, and subscriber prioritization of selection criteria. The prioritization procedure results in determination of one suggested future best access. The future best access determined at the ABC service network 460 is communicated (e.g. as an identification number) from the access wizard unit 461 back to the access wizard agent 413 in the terminal 410. The future best access can either be sent in advance together with an indication of the assumed future time or, alternatively, the transfer does not occur until the predetermined future time arrives.

Predictive access selection indicates that the access wizard unit 461 receives some kind of indication of where the user is heading, such as the planned route or the current direction and speed of the mobile terminal 410. Since users in vehicles 418 normally are confined to certain locations (roads, garages, etc.) and are associated with predictive certainties as for the chosen route, direction and speed of the vehicle, predictive access selection works especially well for (but are not limited to) vehicle scenarios.

According to an embodiment, the access wizard unit 461 also assists the security mechanism, e.g. the AAA infrastructure, in order to achieve seamless mobility. More specifically, the access wizard unit issues the necessary triggers for AAA inter-domain security context transfers. In FIG. 4, it is shown that the access wizard unit 461 sends a triggering message to the AAAh 464. In response to this trigger, the AAAh 464 provides transfer of the necessary security context from the AAAv 471 in the security domain 470 the vehicle 418 is about to leave to the new AAAv. In this way, the new AAAv is prepared for the fact that the mobile terminal 410 will soon be entering its security domain, whereby AAA optimization for fast handoffs can be achieved.

Figure 5:
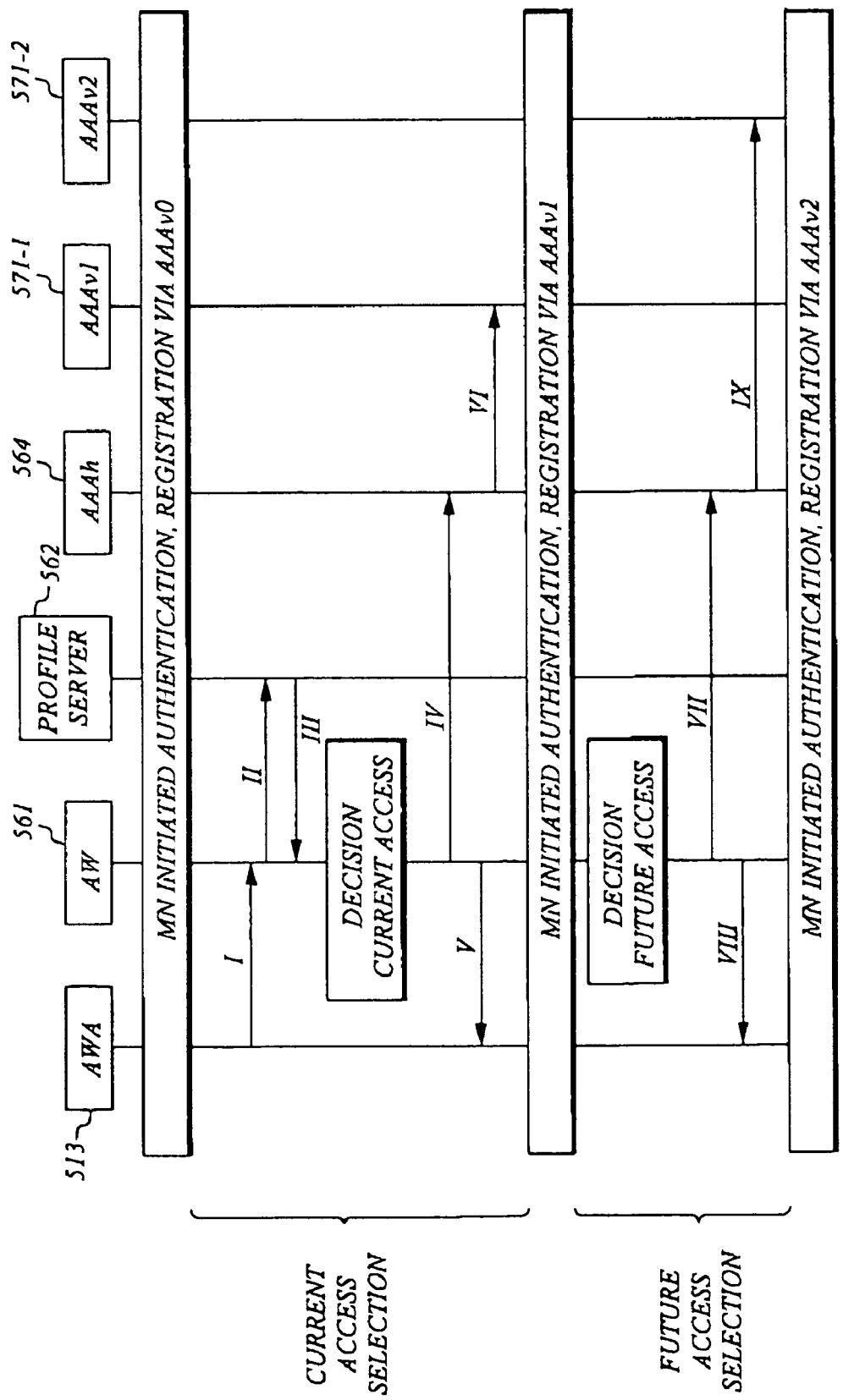
FIG. 5 illustrates signaling flows for current and future access selection according to an embodiment.

The access wizard unit can issue the necessary triggers for inter-domain transfers of security contexts in connection with both the current access selection and the predictive access selection. The predictive access selection might often result in AAA optimization with even smoother handoffs. FIG. 5 illustrates network-based current access selection and predictive access selection, respectively, according to example embodiments. Exemplary signaling flows are shown for the current access selection, with handoff from an access network assigned under AAAv0 (not shown) to an access network assigned under AAAv1 571-1, and for the predictive access selection, with further handoff from the access network assigned under AAAv1 571-1 to an access/cell assigned under AAAv2 571-2.

The mobile node/terminal is initially authenticated and registered via the visited security server AAAv0. Prior to the decision regarding the current best access at the access wizard unit 561, terminal specific information, e.g. including the location (GPS), route and velocity of the terminal is transferred from the access wizard agent 513 to the access wizard unit 561 (I). The access wizard 561 queries database information/profiles from the profile server 562 with associated databases (II) and receives a reply containing the requested information from the profile server (III). Based on the information received in (I) and (III) the access wizard determines the currently best access network for the terminal/user, which is communicated to the access wizard agent 513 in the terminal (V). Through a security context transfer request (IV) the access wizard 561 also triggers an AAA security context transfer (VI) between AAAh 564 and AAAv1 571-1 enabling a smooth handoff to an access network assigned under AAAv1 571-1. The request is preferably sent immediately and contains a directive to transfer AAA context information from AAAh to AAAv1. The terminal initiates authentication and registration via AAAv1.

In the case of predictive access selection, the access wizard unit 561 instead uses the information received in (I) and (III) to determine a future best access for the terminal/user, that is to be valid after a predetermined period of time. As before, the best access is communicated to the access wizard agent 513 (VIII) and an AAA context transfer request is sent from the access wizard unit 561 to the AAAh 564 (VII). However, the AAAh is instead instructed to transfer security information to AAAv2 571-2 (IX) for achieving seamless mobility and this directive may sometimes be sent with a delay. The terminal in this case initiates authentication and registration via AAAv2. The authentication and registration of the terminal towards the AAAv0, AAAv1 and AAAv2, respectively, can for instance be based on EAP/AKA and MIPv6.

Furthermore, there may be cases where the access wizard unit during the predictive access selection process realizes that no suitable access is available to support the requirements of the subscriber/application/terminal for the given route. In accordance with another embodiment, the access wizard unit in such situations suggests an alternative route, such that there will be less or no service disruptions. This is referred to as proactive access selection.

The procedure initially follows the one for predictive access selection described above. Thus, a list of future candidate access networks can e.g. be produced by using the current location (x, y), velocity, direction and route (y=f(x)) and assuming a certain future time. Thereafter, a prioritization program is run among these candidate accesses, taking into account prioritization regarding operator selection criteria vs. subscriber selection criteria, operator prioritization of selection criteria, and subscriber prioritization of selection criteria. If there are no candidate access available in at least a portion of the current given route the access wizard unit suggests an alternative route, such that candidate access networks are available for at least a larger portion of the route than for the current route. This may be simplified as displaying subscriber location and possible access networks on a map. The service could also be extended to allow the user to plan possible routes between two locations and with access network availability as new search criteria, e.g. type of service extended with hotspot availability.

Like the predictive access selection, the proactive access selection indicates that the access wizard receives some kind of indication of where the user is heading. Accordingly, the proactive access selection is particularly advantageous for vehicular scenarios. Generally the current chosen route is given, but in some cases, e.g. some vehicular scenarios, the access wizard may be able to conclude where the user is going by just knowing the current location (and preferably also the direction and speed).

Figure 6:
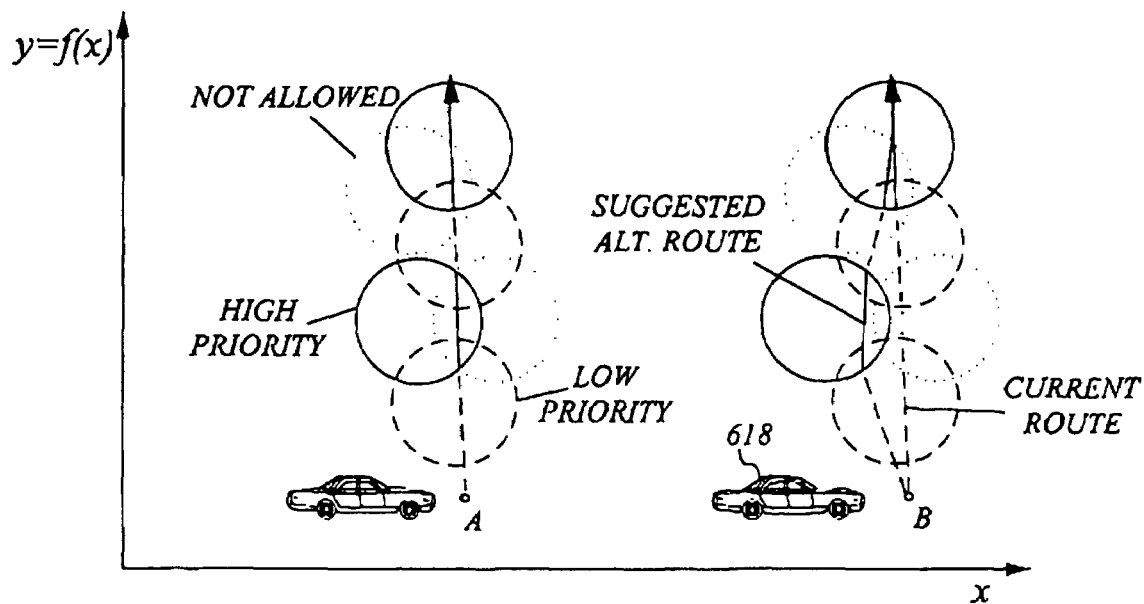
FIG. 6 illustrates expected behaviors in vehicular scenarios with access selection according to an embodiment.

FIG. 6 illustrates expected behaviors in vehicular scenarios with the current, predictive and proactive access selection according to the example embodiments. The expected behaviors for the current and predictive access selection are demonstrated in A. The vehicle chooses high-priority allowed access networks/cells (solid) when available; low-priority allowed access (dashed) when high-priority access is not available, and avoids the non-allowed areas (dotted). B illustrates the expected behavior for the proactive access selection. Solid, dashed and dotted lines, respectively, still means high-priority, low-priority and non-allowed access networks, respectively. When neither high-priority nor low priority allowed accesses are available along the chosen (current) route, an alternative route is suggested such that the coverage is not interrupted. The vehicular application of the proactive access selection may for example be implemented together with a car navigation system.

The solutions described with reference to FIGS. 4-6, especially for the predictive and proactive access selections, have primarily been exemplified by and are especially advantageous for situations where the mobile multi-access terminal resides in a vehicle. Nevertheless, it should be understood that scenarios involving other mobile terminals than those in vehicles also lie within the scope of the present invention. The proposed solutions can be used for handling access selection, mobility and security for any mobile multi-access terminal.

Figure 7:
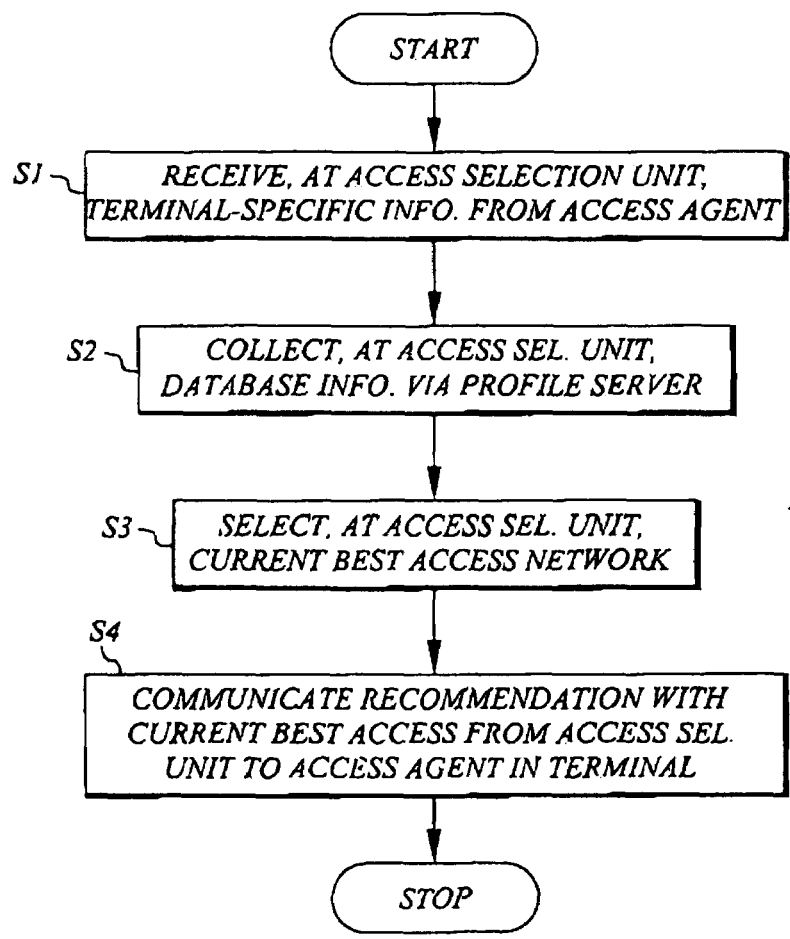
FIG. 7 is a flow chart of an access selection method according to a first embodiment.
Figure 8:
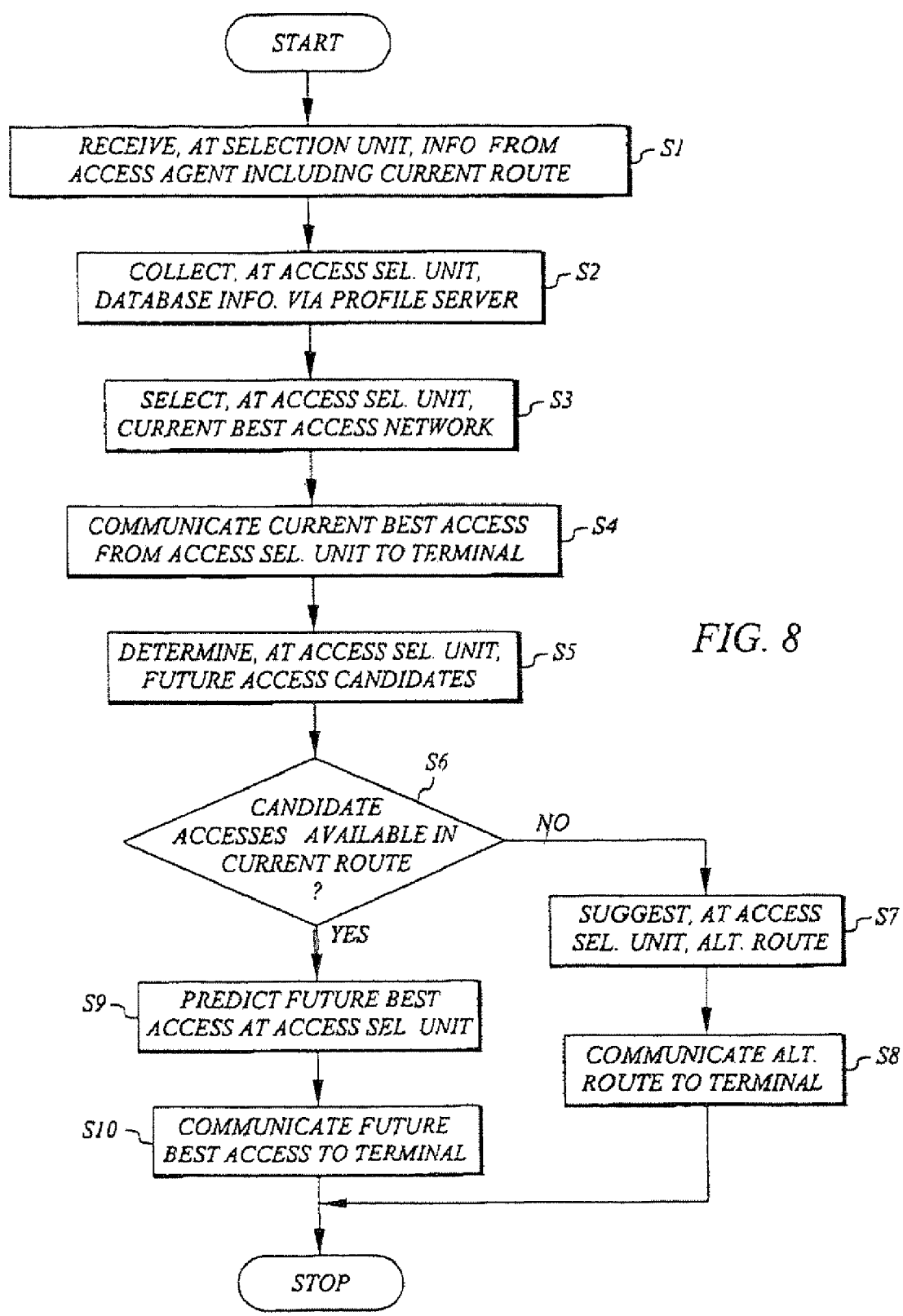
FIG. 8 is a flow chart of an access selection method according to a second embodiment.

Example methods for the current access selection and for the combined current, predictive and proactive access selections, respectively, are summarized by the example flow charts of FIG. 7 and FIG. 8.

FIG. 7 is a flow chart of a method for the current access selection according to an embodiment. In a first step S1, the network-based (i.e. arranged at the network side) access selection unit (access wizard unit) receives terminal-specific information from the access agent (access wizard agent) in the mobile multi-access terminal. The access selection unit then collects database information in a step S2 by requesting and receiving data/information/profiles from a profile server, which is associated with a (typically large) number of databases. Based on the information from the profile server/databases and access agent, the access selection unit selects a current best access network for the terminal in a step S3. This can for instance involve executing an access selection algorithm based on predefined prioritization criteria at the access selection unit. In a final step S4, an access network recommendation comprising the current best access network is communicated from the access selection unit to the access agent. Depending on the implementation, the terminal can be forced to always follow the access network recommendation from the access selection unit, or it can use the recommendation as basis for a final access network determining process at the terminal. In the latter case, the network-based access selection at the access selection unit supports the final access selection decision of the terminal.

FIG. 8 is a flow chart of a method for combined current, predictive and proactive access selection according to another embodiment. The terminal-specific information from the access agent in the first step S1 includes the current (chosen) route for the mobile terminal. The steps S2 to S4 are performed as described with reference to FIG. 7. In a step S5, the access selection unit determines future access candidates, i.e. the access networks that may be possible after a predetermined period of time. Hereby, the access selection unit can for example produce a list of the future access candidates. The access candidates are checked against prioritization criteria and step S6 asks if there are (possible/allowed) candidate access networks available in the current route. If at least a portion of the current route lacks matching candidate access networks, the access selection unit suggests an alternative route for the terminal in a step S7. The alternative route is communicated to the access agent of the terminal in a step S8. This may be achieved in a simple manner by displaying the possible access network areas on a map. Should there, on the other hand, be candidate access networks available in the entire current route one or more future best access networks are selected at the access selection unit in a step S9, preferably by running a prioritization program/executing an access selection algorithm. In a final step S10, an access network recommendation comprising the future best access network(s) is communicated from the access selection unit to the access agent.

Although the invention has been described with reference to specific illustrated embodiments, it should be emphasized that it also covers equivalents to the disclosed features, as well as modifications and variants obvious to a man skilled in the art. Other embodiments may for instance present differently arranged terminal functionality, network functionality and connections/interfaces than the illustrated examples. Thus, the scope of the invention is only limited by the enclosed claims.

REFERENCES

[1] Annika Jonsson, Olle Viktorsson, Ericsson Research, "Access Selection in an Always Best Connected Environment", contribution to the 5$^{th}$ WWRF Meeting in Tempe, Ariz., Mar. 7-8, 2002.
[2] Eva Gustafsson, Annika Jonsson: "Always Best Connected", IEEE Wireless Communications, Vol. 10, Issue 1, February 2003, pp. 49-55.
[3] International Patent Application WO 01/35585 A1, Telefonaktiebolaget LM Ericsson, publication date May 17, 2001.
[4] Dave Johnson, Charles Perkins, Jari Arkko: "Mobility Support in IPv6", IETF Internet draft <draft-ietf-mobileip-ipv6-24.txt>, June 2003.
[5] Pat R. Calhoun, Tony Johansson, Charles E. Perkins: "Diameter Mobile IPv4 Application", IEF Internet draft<draft-ietf-aaa-diameter-mobileip-15.txt>, November 2003.

The invention claimed is:

1. A method for selecting access network for a mobile multi-access terminal in an Internet Protocol (IP)-based communication system that includes a network side of a radio interface and a mobile terminal side of the radio interface, comprising the steps of:
   a network-based access selection unit, arranged at the network side, requesting database information from a network-based profile server associated with a plurality of databases for retrieving database information including access network properties, operator policies, operator/user prioritization criteria, and allowed user subscription profiles;
   said network-based access selection unit receiving the retrieved database information from the profile server;
   said network-based access selection unit receiving terminal-specific information including available/current access networks from an access agent in the mobile terminal;
   said network-based access selection unit selecting a current best access network for the mobile terminal (1) based on the retrieved database information including one or more access network properties, one or more operator policies, one or more operator/user prioritization criteria, and one or more allowed user subscription profiles and (2) also based on the terminal-specific information including available/current access networks; and
   said network-based access selection unit communicating an access network recommendation including an indication of the selected current best access network to the access agent in the mobile terminal to enable a final decision, by an access manager in said mobile terminal, on which access network to use based on said access network recommendation.

2. The method of claim 1, wherein the selecting step involves executing an access selection algorithm based on predefined prioritization criteria.

3. The method of claim 1, further comprising the steps of
   collecting, at the profile server, the database information from at least a subset of its associated databases; and
   adapting, at the profile server, at least some of the database information such that it can be read by the access selection unit.

4. The method of claim 1, wherein the database information comprises information related to an item selected from the group of: access network, user device, end user and operator.

5. The method of claim 1, wherein the terminal-specific information comprises information related to an item selected from the group of: available access networks, currently used applications, location, speed, direction and route.

6. The method of claim 1, wherein the mobile terminal resides in a vehicle and the terminal-specific information from the access agent comprises measurements from a device selected from the group of: a Global Positioning System (GPS) device, a route sensor and a velocity sensor.

7. The method of claim 1, further comprising the steps of
   predicting, at the access selection unit, a future best access network for the mobile terminal based on the database information from the profile server; and
   communicating the future best access network prediction from the access selection unit to the access agent.

8. The method of claim 1, wherein the terminal-specific information comprises an indication of a current terminal route, further comprising the steps of
   determining, at the access selection unit, which access networks that will be possible access candidates after a predetermined period of time; and
   suggesting, from the access selection unit, if there is no access candidate for at least a portion of the current terminal route, an alternative terminal route to the access agent.

9. The method of claim 1, wherein the access selection unit and the profile server are parts of an overall service network for services related to mobility, security and access handling.

10. The method of claim 9, wherein the service network further comprises a security server unit to which the profile server transfers database information for authentication, authorization and accounting purposes.

11. The method of claim 9, further comprising the steps of
    sending a triggering message from the access selection unit to a security server unit in the service network when the mobile terminal is about to change from a first to a second access network; and
    transferring, via the security server unit, security information between security domains associated with the first and second access networks in response to the triggering message.

12. The method of claim 1, further comprising the steps of
    sending terminal-related database information from the profile server to an application server in the service network; and
    adapting, at the application server, an application for the mobile terminal based on the terminal-related database information.

13. A network-based server device in an IP-based communication system includes a network side of a radio interface and a mobile terminal side of the radio interface, comprising
    means for requesting database information from a network-based profile server associated with a plurality of databases for retrieving database information including access network properties, operator policies, operator/user prioritization criteria, and allowed user subscription profiles;
    means for receiving the retrieved database information from the profile server;
    means for receiving terminal-specific information, including available access networks, from an access agent in the mobile terminal
    means for selecting a current best access network for the mobile terminal (1) based on the retrieved database information including one or more access network properties, one or more operator policies, one or more operator/user prioritization criteria, and one or more allowed user subscription profiles and (2) also based on the terminal-specific information including available access networks; and
    means for communicating an access network recommendation including an indication of the selected current best access network to the access agent in the mobile terminal to enable a final decision, by an access manager in said mobile terminal, on which access network to use based on said access network recommendation.

14. The device of claim 13, wherein the means for selecting comprises means for executing an access selection algorithm based on predefined prioritization criteria.

15. The device of claim 13, further comprising
    means for predicting a future best access network for the mobile terminal based on the database information from the profile server; and
    means for communicating the future best access network prediction to the mobile terminal.

16. The device of claim 13, further comprising
    means for determining which access networks that will be possible access candidates after a predetermined period of time; and
    means for suggesting, if there is no access candidate for at least a portion of the current terminal route, an alternative terminal route to the mobile terminal.

17. The device of claim 13, belonging to an overall service network for services related to mobility, security and access handling.

18. The device of claim 17, further comprising means for sending a triggering message to a security server unit in the service network when the mobile terminal is about to change from a first to a second access network, whereby security information is transferred between security domains associated with the first and second access networks via the security server unit in response to the triggering message.

19. An IP-based communication system having a network side of a radio interface and a mobile terminal side of the radio interface with for providing communications with a mobile multi-access terminal via one of multiple access networks, comprising:
    network-based access selection means, arranged in a network-based access selection unit on the network side, for requesting database information from a network-based profile server associated with a plurality of databases for retrieving database information including access network properties, operator policies, operator/user prioritization criteria and allowed user subscription profiles;
    means, arranged in the network-based access selection means, for receiving the retrieved database information from the profile server;
    means, arranged in the network-based access selection means, for receiving terminal specific information, including available access networks, from an access agent in the mobile terminal;
    means, arranged in the access selection means, for selecting a current best access network for the mobile terminal (1) based on the retrieved database information including one or more access network properties, one or more operator policies, one or more operator/user prioritization criteria, and one or more allowed user subscription profiles and (2) also based on the terminal-specific information including available access networks; and means for communicating an access network recommendation including an indication of the selected current best access network from the network-based access selection means to the access agent in the mobile terminal to enable a final decision, by an access manager in said mobile terminal, on which access network to use based on said access network recommendation.

20. The system of claim 19, wherein the profile server provides a unified interface towards its associated databases.

21. The system of claim 19, wherein the network-based access selection means and the profile server are parts of an overall service network for services related to mobility, security and access handling.

22. The system of claim 19, wherein the service network further comprises a security server unit with means for communicating with the profile server for authentication, authorization and accounting purposes.

23. The system of claim 19, further comprising means for sending terminal-related database information from the profile server to an application server in the service network; and means for adapting, at the application server, an application for the mobile terminal based on the terminal-related database information.

24. A mobile terminal associated with at least two access possibilities in an IP-based communication system that has means for selecting an access network for the mobile terminal, comprising:

link managers, a link manager for each access network interface of the terminal, said link managers also operable for detecting available/current access networks;

means for transmitting terminal-specific information including available/current access networks from an access agent in the mobile terminal to a network-based unit for access selection in the network;

means for receiving, at the access agent, an access network recommendation comprising an indication of the current best access network from the network-based access selection unit selected (1) based on retrieved database information including one or more access network properties, one or more operator policies, one or more operator/user prioritization criteria, and one or more allowed user subscription profiles and (2) also based on the terminal-specific information including available access networks;

means for forwarding the access network recommendation from the access agent to an access manager in the mobile terminal;

means for determining, at the access manager, which access network to use based on the access network recommendation and input user preferences and/or priority information in the mobile terminal; and means for providing corresponding instructions from said access manager to the link manager(s), by means of which the terminal can be connected/disconnected to the respective access network.

25. A network-based server device in an IP-based communication system includes a network side of a radio interface and a mobile terminal side of the radio interface, comprising electronic circuitry configured to:

request database information from a network-based profile server associated with a plurality of databases for retrieving database information including access network properties, operator policies, operator/user prioritization criteria, and allowed user subscription profiles;

receive the retrieved database information from the profile server;

receive terminal-specific information, including available access networks, from an access agent in the mobile terminal select a current best access network for the mobile terminal (1) based on the retrieved database information including one or more access network properties, one or more operator policies, one or more operator/user prioritization criteria, and one or more allowed user subscription profiles and (2) also based on the terminal-specific information including available access networks; and generate an access network recommendation including an indication of the selected current best access network to the access agent in the mobile terminal to enable a final decision, by an access manager in said mobile terminal, on which access network to use based on said access network recommendation.

26. An IP-based communication system having a network side of a radio interface and a mobile terminal side of the radio interface with for providing communications with a mobile multi-access terminal via one of multiple access networks, comprising:

a network-based access selector on the network side configured to request database information from a network-based profile server associated with a plurality of databases for retrieving database information including access network properties, operator policies, operator/user prioritization criteria and allowed user subscription profiles;

receiving circuitry arranged on the network side for receiving the retrieved database information from the profile server and for receiving terminal specific information, including available access networks, from an access agent in the mobile terminal;

selection circuitry, arranged on the network side, configured to select a current best access network for the mobile terminal (1) based on the retrieved database information including one or more access network properties, one or more operator policies, one or more operator/user prioritization criteria, and one or more allowed user subscription profiles and (2) also based on the terminal-specific information including available access networks; and signal generation circuitry configured to communicate an access network recommendation signal including an indication of the selected current best access network from the network-based access selector to the access agent in the mobile terminal to enable a final decision, by an access manager in said mobile terminal, on which access network to use based on said access network recommendation.

27. A mobile terminal, associated with at least two access possibilities in an IP-based communication system, for selecting an access network for the mobile terminal, comprising:

multiple link managers, wherein each access network interface of the terminal has an associated link manager, said link managers also being configured to detect available/current access networks;

a transmitter for transmitting terminal-specific information including available/current access networks from an access agent in the mobile terminal to a network-based unit for access selection in the network;

a receiver for receiving, at the access agent, an access network recommendation including an indication of the current best access network from the network-based access selection unit selected (1) based on retrieved database information including one or more access network properties, one or more operator policies, one or more operator/user prioritization criteria, and one or more allowed user subscription profiles and (2) also based on the terminal-specific information including available access networks; and data processing circuitry configured to:

forward the access network recommendation from the access agent to an access manager in the mobile terminal;

determine, at the access manager, which access network to use based on the access network recommendation and input user preferences and/or priority information in the mobile terminal; and provide corresponding instructions from said access manager to the link manager(s) to permit the terminal to be connected to the respective access network.

* * * * *

UNITED STATES PATENT AND TRADEMARK OFFICE
CERTIFICATE OF CORRECTION

PATENT NO. : 7,436,843 B2
APPLICATION NO. : 10/724391
DATED : October 14, 2008
INVENTOR(S) : Gustafsson et al.

It is certified that error appears in the above-identified patent and that said Letters Patent is hereby corrected as shown below:

In Column 1, Line 11, delete "and a" and insert -- and --, therefor.

In Column 2, Line 42, delete "is" and insert -- it is --, therefor.

In Column 3, Line 40, delete "embodiment." and insert -- embodiment; --, therefor.

In Column 4, Line 39, delete "preferences" and insert -- preferences. --, therefor.

In Column 5, Line 9, delete "261" and insert -- unit 261 --, therefor.

In Column 5, Line 22, delete "of the for" and insert -- of the --, therefor.

In Column 6, Line 24, delete "occurs" and insert -- occurs. --, therefor.

In Column 7, Line 32, after "IPv6 is" and insert -- IPv6 [4] is --, therefor.

In Column 7, Line 39, delete "application." and insert -- application [5]. --, therefor.

In Column 8, Line 31, delete "463" and insert -- 463. --, therefor.

In Column 12, Line 27, delete "IEF" and insert -- IETF --, therefor.

In Column 14, Line 5, in Claim 13, delete "terminal" and insert -- terminal; --, therefor.

In Column 16, Line 10, in Claim 25, delete "terminal" and insert -- terminal; --, therefor.

Signed and Sealed this

Thirty-first Day of March, 2009

JOHN DOLL
*Acting Director of the United States Patent and Trademark Office*